P. & M. C. Jobson,
Reciprocating Saw Mill.
No. 105,804. Patented July 26, 1870.
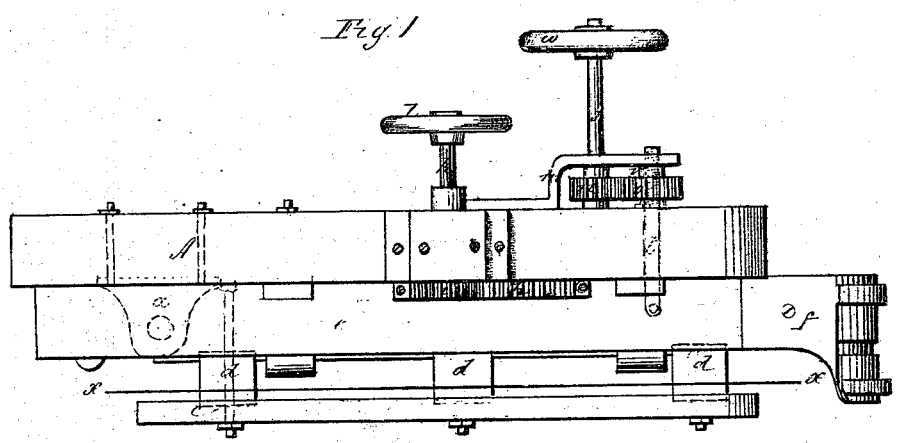
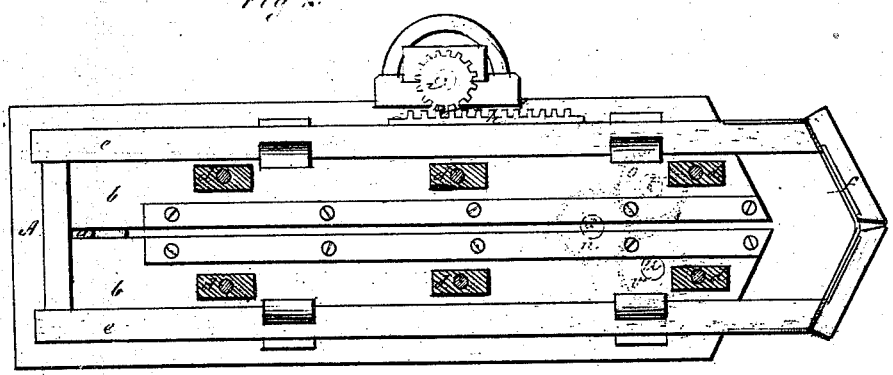
Philip and Michael C. Jobson, Inventors.
Witnesses:
H. J. Aretz
C. A. Pettit
by Munn & Co.
their Attorneys.

United States Patent Office.

PHILIP JOBSON AND MICHAEL C. JOBSON, OF LOCKHAVEN, PENNSYLVANIA.

Letters Patent No. 105,804, dated July 26, 1870.

IMPROVEMENT IN SAW-MILLS.

The Schedule referred to in these Letters Patent and making part of the same.

*To all whom it may concern:*

Be it known that I, PHILIP JOBSON and MICHAEL C. JOBSON, of Lockhaven, in the county of Clinton and State of Pennsylvania, have invented a new and improved Adjustable Muley-saw Head; and we do hereby declare the following to be a full, clear, and exact description of the same, reference being had to the accompanying drawing making a part of this specification, in which—

Figure 1 is a side elevation, and
Figure 2 is a transverse vertical section.

This invention has for its object to render a muley-saw head adjustable horizontally, for the purpose of regulating the overhang of the saw according to the length of the feed.

The forward movement of the carriage, which feeds the log to a muley-saw, is made half during the up-stroke of the saw, and completed during the down-stroke. Saws are, therefore, hung at an inclination, termed overhang, in order that they may cut so far into the log during their down-strokes that the log, in its forward movement, will not strike the teeth during the up-stroke. In order that all the teeth may cut during the down-stroke, it is necessary that the feed be equal to the overhang, so as to bring the log close to the teeth at the beginning of the down-stroke. But, as the length of the feed requires changing according to the nature of the log, the overhang should be made adjustable also, so as to make it conform to the increased or diminished length of feed, for, if the feed be too long, the log will be crowded upon the saw, and break it, while, if the feed be too short, only the upper teeth will cut.

Our invention consists in an apparatus for rendering the saw-head adjustable, in order to accomplish the object stated.

In the drawing—

A is the back of the saw-frame.

*a* is a yoke projecting forward from the upper part of the back A.

*b b* are the back guides, which are hung upon a pin set crosswise of the yoke *a*, so as to swing upon the same, said back guides being coupled together by metal plates, and fixed thus at a suitable distance apart for the saw to be placed between them.

*c c* are the front guides.

*d* are the dead-wedges, which connect the front and back guides.

*e e* are the guards, placed outside the back guides *b*.

*f* is the coupling which connects the lower ends of the guards *e*, and guides the saw, which passes through a slot in the coupling.

*h* is a rack in the side of one of the guards *e*.

*i* is a pinion placed on the end of a shaft, *k*, that is mounted in a box on the back A, the pinion *i* gearing with the rack *h*.

*l* is a hand-wheel on the shaft *k*, by which the guards *e* may be raised or lowered.

*m* is a plate, fastened, at its upper end, to the back A, and standing off from said back far enough to inclose three spur-gears, *n o r*, which mesh together.

*s* is a shaft passing through the plate *m*, and supporting the spur-gear *n*.

*t u* are bolts supporting the nuts *v*, passing through the back A, and entering the back guides *b*, one bolt to each back guide.

*v* are nuts supporting the spur-gears *o r*, and placed around the shafts *t u*, and between the back A and plate *m*.

*w* is a hand-wheel on the shaft *s*.

On turning the hand-wheel *w*, the bolts *t u* are rotated by means of the spur-gears *n o r*, and either run in or out through the nuts *v*, according to the direction in which the shafts *s* are rotated.

The bolts either throw the lower ends of the back and front guides *b c* away from the back A, or draw them toward it.

The upper end of the saw being placed between the lower ends of said guides, its overhang is regulated according to their movements.

We are aware of the patent of Morrison and Harms, dated May 4, 1869. We hereby disclaim the devices covered by that patent.

Having thus described our invention,

What we claim as new, and desire to secure by Letters Patent, is—

The muley-saw head *b c d*, when hung upon the yoke *a*, which projects from the back A, and combined with the bolts *t u*, nuts *v*, spur-gears *n o r*, shaft *s*, and plate *m*, constructed, arranged, and operating as specified.

PHILIP JOBSON.
MICHAEL C. JOBSON.

Witnesses:
WM. P. MARR,
T. C. HIPPLE.